Figure 1:
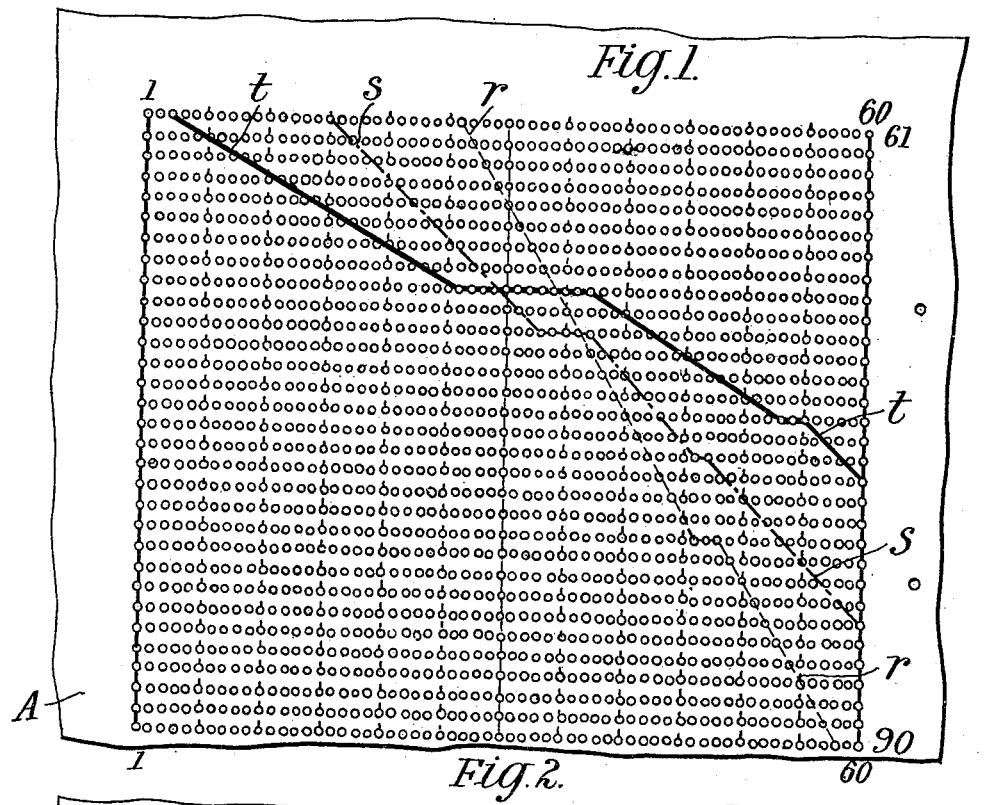

R. TOMLINSON.
TRAIN AND OTHER DIAGRAM.
APPLICATION FILED MAY 22, 1909.

945,641.

Patented Jan. 4, 1910.

WITNESSES.

INVENTOR.
Robert Tomlinson
his Attorneys

UNITED STATES PATENT OFFICE.

ROBERT TOMLINSON, OF DERBY, ENGLAND.

TRAIN AND OTHER DIAGRAM.

945,641.  Specification of Letters Patent.  Patented Jan. 4, 1910.

Application filed May 22, 1909.  Serial No. 497,781.

*To all whom it may concern:*

Be it known that I, ROBERT TOMLINSON, a subject of His Majesty the King of Great Britain, and a resident of Derby, England, have invented a certain new and useful Improvement in Train and other Diagrams, of which the following is a specification.

In what is known as kindergarten work it is of course common to employ perforated cards or canvas through which wool of different color is threaded to produce a predetermined design, and such are common in the old fashioned sampler, the worked slipper and even in the ancient tapestries, and it has also been proposed to keep scores in games by threading different colored cords through a perforated card, and also to place or move a transparent sheet of glass bearing certain marks over a sheet of another material through which light is projected to enable comparisons to be made.

My invention differs from the foregoing in that it provides a simple and efficacious means by which the running of a series of trains without conflict may be readily arranged and cross line or local traffic be provided for, or market fluctuations or other variations in units of time weight or the like be readily prepared and compared one with another.

In the method of preparing diagrams for trains and for other purposes as now generally employed it is customary to use section paper divided into squares and in the case of train diagrams the horizontal lines are used to indicate stations and junctions and the vertical lines the time to be occupied by any given train traveling from one point to another, the course of the different trains and their scheduled times being indicated by different colored inks, and with diagrams or charts so prepared it is obviously difficult to make alterations or to try the effect or possibility of running extra trains satisfactorily as the multiplicity of lines some of which are only tentative or temporary is confusing. It is also common to employ similar section paper and to place by ink or pencil lines thereon variations of any unit of time, money, stock, weight, or temperature, or the like, of which it may be desired to make a record and various colored inks are employed for indicating different commodities, or units.

The object of the present invention is to render the preparation of any such graphic representation more simple and efficient as also to enable one or more of the graphic representations to be easily removable from the chart and to add others thereto as and when required as also to render the comparison of one chart with another an easy matter, and to this end the invention consists in forming said chart of transparent material with a series of perforations through which can be threaded cords or ribbons of different colors both vertically and horizontally, the various lines of perforations being suitably indicated by explanatory side notes or otherwise. The chart base being of transparent material such as celluloid it is possible to superpose one chart upon another for ready comparison and this is particularly useful in arranging the time tables of loop or branch lines of railway which may necessitate trains crossing a main line.

Figure 2:
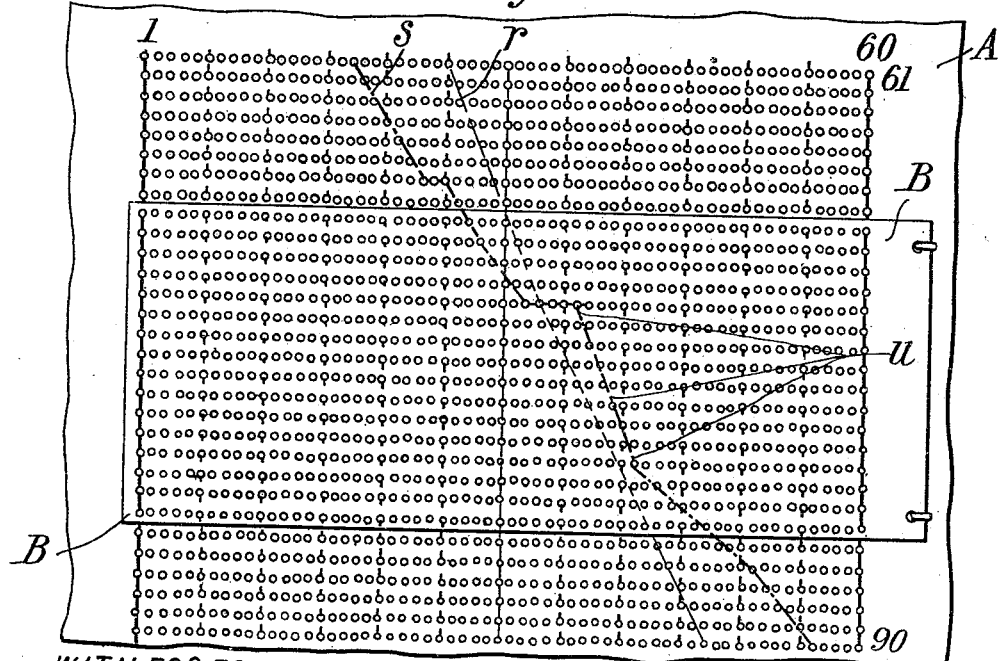

In the accompanying drawings:—Figure 1 is a plan view of a diagram or chart prepared in accordance with this invention; and Fig. 2 a view showing a second diagram or chart attached to the main one and suitable for arranging the time of a branch or loop train so as to free same from conflict with main line traffic.

In said drawings the base or substance of the proposed chart is indicated by A which is perforated by any suitable number of lines of perforations depending upon the purposes for which the finished diagram or chart is required.

Assume that a train diagram is required as from a description thereof the application of the invention to variations in temperature, values of stocks, or for other purposes will be evident. In such a case the horizontal lines of holes 1 to 60 may indicate the minutes or other unit of time and the vertical lines 61 to 90 units of distance say one mile between each or of the stations or stopping places in which latter case the names may be placed opposite the various lines.

The course of a series of trains and their scheduled times is indicated by threads of various colors being passed through the holes in the sheet and out again through other holes according to the length of stoppage at, or time of passing any station or other point, the names of the latter being indicated on one or both sides or at intermediate places on the diagram. The beginning and end of each thread may be fastened off by means of a soft metal bead or split shot (not shown upon the drawings) pinched thereon by means of a pair of pliers, or be held by clips. Upon the diagram (Fig. 1) the timing of an express passenger train is indicated by the fine dotted line $r$ which would in actual use be represented by say a red cord. The thicker dotted line $s$ represents the track of a slow passenger train and might be represented by a blue cord, while the thick firm line $t$ represents the track of a goods train which might be represented by say a yellow cord. If the vertical distances on the sheet be made to represent the actual distances covered, the lines of the threads will form speed angles and indicate at a glance the speed of a train between any two points. The times of the trains running in one direction may be read downward and in the opposite direction upward as is well known in train diagrams.

It is obviously a great advantage to have a removable thread, as a new timetable sometimes only contains alterations to say twenty-five per cent. of the trains contained in the previous issue, and instead of making a complete new diagram for each timetable issued, only canceled, altered and new trains are taken out, or inserted as the case may be, and a considerable saving in labor is effected by leaving say seventy-five per cent. of the old train threads intact. There is a further saving as compared with the existing method owing to the ease and rapidity of the operation of threading a transparent material.

The horizontal lines may further be specially marked for every five minutes, half hours and the like, if desired, it being understood that this diagram only represents a small portion of the sheet which would be used in practice.

The following are some further advantages of this method of preparing train diagrams:—For schemes of alterations a thinner or otherwise distinctive thread may be inserted without disturbing the diagram of existing service: where there are more than one set of rails for one direction two or more diagrams may be used face to face, or distinction may be made in the trains using the slow line by employing thicker thread: or, by arranging for slow train threads to appear on one side only of the diagram sheet. The diagram may be hinged to fold up to a convenient size. Small diagram sheets of branch or loop lines may be hinged or otherwise secured to the main diagram by means of loops of thread or the like so that the timing of a train throughout may be seen at a glance or they may be kept separate as found convenient.

As shown in Fig. 2 a small diagram of a branch or loop line is shown hinged or attached to the main diagram so that it may be folded down or superposed so that the times of local trains crossing or connecting with the main line may be readily arranged and regulated. Upon such small diagram sheet B is indicated by $u$ the course and time of an imaginary loop line train.

The transparent sheets may be marked with other information than that given above, such as the days of the weeks the trains run, the numbers of engines working or class of engines, particulars relating to loading and the like, or such information could be marked on a small tablet to be threaded on, or otherwise fixed to its respective thread: separate continuous and distinctive threads may be used for each engine, motor, auto-car, or set of coaches.

In some cases it will be found desirable to have separate unattached sheets on which the proposed running of a special or other train may be tentatively indicated and if such sheet be transparent it may be superposed on that forming the permanent train diagram when it will at once be evident what, if any, alterations in time are required to be made to prevent conflict of trains at particular points.

It is obvious that for recording many matters, say the price of commodities, it is not essential to employ either hinged or transparent sheets and that the lines of perforations may be used to indicate instead of time and distance say quantities and values or for other purposes.

What is claimed is:—

1. Train or other diagrams formed of transparent perforated sheets combined with different colored threads or ribbons passing through the perforations, substantially as and for the purposes set forth.

2. Train or other diagrams formed of a transparent sheet to which is attached a second transparent perforated sheet combined with different colored threads or ribbons passing through the perforations, substantially as and for the purposes set forth.

In testimony whereof I have hereunto set my hand in the presence of two subscribing witnesses.

ROBERT TOMLINSON.

Witnesses:
C. K. Eddowes,
F. A. Rolloson.